US008883938B2

(12) United States Patent
Kobayashi et al.

(10) Patent No.: US 8,883,938 B2
(45) Date of Patent: Nov. 11, 2014

(54) RESIN COMPOSITION FOR FIBER-REINFORCED COMPOSITE MATERIAL, CURED PRODUCT THEREOF, FIBER-REINFORCED COMPOSITE MATERIAL, MOLDING OF FIBER-REINFORCED RESIN, AND PROCESS FOR PRODUCTION THEREOF

(75) Inventors: Atsuko Kobayashi, Ichihara (JP); Ichirou Ogura, Ichihara (JP)

(73) Assignee: DIC Corporation, Tokyo (JP)

( * ) Notice: Subject to any disclaimer, the term of this patent is extended or adjusted under 35 U.S.C. 154(b) by 268 days.

(21) Appl. No.: 13/496,619

(22) PCT Filed: Sep. 14, 2010

(86) PCT No.: PCT/JP2010/065795
§ 371 (c)(1),
(2), (4) Date: Jun. 26, 2012

(87) PCT Pub. No.: WO2011/034042
PCT Pub. Date: Mar. 24, 2011

(65) Prior Publication Data
US 2012/0259039 A1    Oct. 11, 2012

(30) Foreign Application Priority Data
Sep. 18, 2009   (JP) ................... 2009-216997

(51) Int. Cl.
B29C 45/02 (2006.01)
B32B 27/04 (2006.01)
C08J 5/04 (2006.01)
C08K 7/06 (2006.01)
C08L 63/02 (2006.01)
C08L 63/04 (2006.01)
C08G 59/17 (2006.01)
C08F 283/10 (2006.01)
C08G 59/50 (2006.01)

(52) U.S. Cl.
CPC ........... *C08F 283/10* (2013.01); *C08J 2363/00* (2013.01); *C08G 59/1466* (2013.01); *C08G 59/50* (2013.01); *C08J 5/04* (2013.01)
USPC .............. 525/531; 264/328.1; 264/331.12; 428/297.4; 428/365; 523/468; 525/438; 525/502; 525/530

(58) Field of Classification Search
None
See application file for complete search history.

(56) References Cited

U.S. PATENT DOCUMENTS 8,487,052 B2 * 7/2013 Kobayashi et al. ........... 525/531
2012/0252930 A1 * 10/2012 Kobayashi et al. ........... 523/400
2013/0281576 A1 * 10/2013 Kobayashi et al. ........... 523/468

FOREIGN PATENT DOCUMENTS

| JP | 55-110115 A | * | 8/1980 |
| JP | 06-255027 A | | 9/1994 |
| JP | 6-255027 A | * | 9/1994 |
| JP | 07-053676 A | | 2/1995 |
| JP | 7-53676 A | * | 2/1995 |
| JP | 2005-042105 A | | 2/2005 |
| JP | 2005-42105 A | * | 2/2005 |
| JP | 2006-265434 A | | 10/2006 |
| JP | 2007-154088 A | * | 6/2007 |
| JP | 2007-154088 A | | 6/2007 |
| JP | 2010-24315 A | * | 2/2010 |
| WO | WO 2011/021516 A1 | * | 2/2011 |

OTHER PUBLICATIONS

Epiclon Standard Products: Epoxy Resins & Curing Agents, DIC Corporation, Mar. 2013, 16 pages.*
International Search Report dated Nov. 16, 2010, issued for PCT/JP2010/065795.

* cited by examiner

*Primary Examiner* — Robert Sellers
(74) *Attorney, Agent, or Firm* — Edwards Wildman Palmer LLP; James E. Armstrong, IV

(57) ABSTRACT

The present invention provides a resin composition for a fiber-reinforced composite material, which has excellent fluidity at low temperature and which produces a cured product having excellent mechanical strength, and also provides a cured product thereof, a fiber-reinforced composite material, a fiber-reinforced resin molding having excellent heat resistance, and a process for producing a fiber-reinforced resin molding with good productivity. A resin composition for a fiber-reinforced composite material contains, as essential components, an epoxy resin (A), an acid group-containing radical polymerizable monomer (B), a radical polymerization initiator (C), and an amine-based curing agent (D) for an epoxy resin, and has a viscosity of 500 mPa·s or less at 50° C. measured with an E-type viscometer. The composition is impregnated into reinforcing fibers and cured.

15 Claims, No Drawings

RESIN COMPOSITION FOR FIBER-REINFORCED COMPOSITE MATERIAL, CURED PRODUCT THEREOF, FIBER-REINFORCED COMPOSITE MATERIAL, MOLDING OF FIBER-REINFORCED RESIN, AND PROCESS FOR PRODUCTION THEREOF

TECHNICAL FIELD

The present invention relates to a fiber-reinforced composite material suitable for aircraft members, spacecraft members, automobile members, and the like because they exhibit excellent fluidity and produce cured products having excellent mechanical strength, a process for producing the material, and a matrix resin material of the fiber-reinforced composite material.

BACKGROUND ART

In view of excellent physical properties such as high heat resistance, moisture proof, dimensional stability, etc., epoxy resin compositions each containing an epoxy resin and a curing agent therefor as essential components are widely used for electronic components such as a semiconductor encapsulating material, a printed circuit board, a build-up substrate, and resist ink, a conductive adhesive such as a conductive paste and other adhesives, a liquid sealing material such as an underfill, a liquid crystal sealing material, a cover lay for a flexible substrate, an adhesive film for build up, a coating material, a photoresist material, a color developing material, a fiber-reinforced composite material, and the like.

Among these, particularly, fiber-reinforced resin composite materials produced by impregnating reinforcing fibers with an epoxy resin and a curing agent as matrix components and then curing the resin are highly required in general industrial fields such as automobile industry and aerospace industry from the viewpoint of various excellent performances such as high heat resistance, low curing shrinkage percentage, chemical resistance, high elastic modulus, etc. in addition to properties such as light weight and high strength.

However, epoxy resins are generally high-viscosity fluids or solids at normal temperature, and thus in a step of impregnating fiber reinforcements with the resins, it is necessary to heat resin components to 100° C. or more in order to secure a practical level of fluidity for the epoxy resins, thereby causing the problem of accelerating curing of the epoxy resins by heating and rather bringing about higher viscosity and impregnation failure. In particular, in a resin transfer molding (RTM) process which has recently been being popularized in the field of carbon fiber-reinforced thermosetting plastics (CFRP) because of the overwhelming cycle time and low equipment cost, low viscosity and high fluidity are essential properties for thermosetting resin materials.

Therefore, there has been known a technique for improving CFRP productivity by the RTM process, in which as an epoxy resin material suitable for the RTM process in CFRP application, a bisphenol F epoxy resin having an epoxy equivalent of, for example, 200 g/eq. or less, is used as a base resin, and aromatic polyamine, which is liquid at room temperature, and a complex of a Lewis acid and a base are used as curing agent components, thereby improving fluidity of a thermosetting resin component and further improving low-temperature curability (refer to PTL 1).

However, in the thermosetting resin material containing the bisphenol F epoxy resin having an epoxy equivalent of 200 g/eq. or less, the aromatic polyamine which is liquid at room temperature, and the complex of a Lewis acid and a base, the viscosity of the epoxy resin is decreased, but the viscosity of the whole composition is still high, thereby necessitating heating for resin injection in RTM molding. Therefore, the possibility of thickening by curing reaction remains, and the running cost is increased in terms of energy. In addition, a cured product has unsatisfactory mechanical strength and heat resistance and has difficulty in applying to the automobile industry and the aerospace industry.

Also, there has been known a technique for producing a cured produced having excellent heat resistance by curing a composition prepared by mixing maleic acid monoallyloxy ester with an epoxy resin (refer to PTL 2 below). However, this composition has high viscosity and thus exhibits poor productivity even when being applied to fiber-reinforced resin molded products.

CITATION LIST

Patent Literature

PTL 1: Japanese Unexamined Patent Application Publication No. 2006-265434
PTL 2: Japanese Unexamined Patent Application Publication No. 2005-42105

SUMMARY OF INVENTION

Technical Problem

Accordingly, a problem to be solved by the invention is to provide a resin composition for a fiber-reinforced composite material which has excellent fluidity and which imparts excellent mechanical strength and heat resistance to a cured product, a cured product thereof, a fiber-reinforced composite material, a fiber-reinforced resin molding having excellent mechanical strength and heat resistance, and a process for producing the fiber-reinforced resin molding with high productivity.

Solution to Problem

As a result of intensive research for solving the problem, the inventors found that fluidity of a composition in an epoxy curing system and mechanical strength after curing can be improved by using, as a thermosetting resin component to be impregnated in a fiber reinforcement and cured, a composition which contains, as essential components, an epoxy resin (A), an acid group-containing radical polymerizable monomer (B), a radical polymerization initiator (C), and an amine-based curing agent (D) for an epoxy resin and which has a viscosity of 500 mPa·s or less at 50° C. measured with an E-type viscometer, and by curing the composition by so-called in-situ reaction in which curing reaction between the epoxy resin (A) and the amine-based curing agent (D) for an epoxy resin is performed, and at the same time, reaction between the epoxy resin (A) and the acid group-containing radical polymerizable monomer (B) and polymerization of a radical polymerizable group caused by the monomer (B) are continuously or simultaneously performed. That is, an acid group in the monomer (B) is reacted with an epoxy group in the epoxy resin (A), and at the same time, a radical polymerizable group caused by the monomer (B) is polymerized. This finding led to the achievement of the present invention.

That is, the present invention relates to a resin composition for a fiber-reinforced composite material, the resin composition containing, as essential components, an epoxy resin (A), an acid group-containing radical polymerizable monomer (B), a radical polymerization initiator (C), and an amine-based curing agent (D) for an epoxy resin, wherein the viscosity at 50° C. measured with an E-type viscometer is 500 mPa·s or less.

The present invention further relates to a cured product produced by in-situ reaction of the resin composition for a fiber-reinforced composite material.

The present invention further relates to a process for producing a fiber-reinforced composite material, the process including impregnating, by injection, a base material, which is composed of reinforcing fibers and disposed in a mold, with the resin composition for a fiber-reinforced composite material, and then in-situ curing the resin composition.

Advantageous Effects of Invention

According to the present invention, it is possible to provide a resin composition for a fiber-reinforced composite material which has excellent fluidity at low temperature and which imparts excellent mechanical strength to a cured product, a cured product thereof, a fiber-reinforced composite material, a fiber-reinforced resin molding having excellent heat resistance, and a process for producing the fiber-reinforced resin molding with good productivity.

DESCRIPTION OF EMBODIMENTS

The present invention is described in detail below.

A resin composition for a fiber-reinforced composite material of the present invention contains, as thermosetting resin components, an epoxy resin (A), an acid group-containing radical polymerizable monomer (B), a radical polymerization initiator (C), and an amine-based curing agent (D) for an epoxy resin, as essential components, the viscosity at 50° C. measured with an E-type viscometer being adjusted to 500 mPa·s or less. A fiber reinforcing material is impregnated with the composition and then reacted continuously or simultaneously, i.e., radical polymerization due to the component (B), curing reaction between the component (A) and component (D), and reaction between the component (A) and the component (B) or an acid group in the radical polymer are continuously or simultaneously performed. Such curing by in-situ reaction can improve fluidity of an epoxy resin composition containing an epoxy resin and a curing agent as essential components before curing and also significantly improve mechanical strength of a cured product. Further, in the present invention, the amine-based curing agent (D) for an epoxy resin is used as an epoxy resin curing agent, thereby significantly increasing the strength of a cured product. As a result, excellent fluidity can be exhibited before curing, and nonconventional mechanical strength can be exhibited after curing.

Examples the epoxy resin (A) used in the present invention include bisphenol epoxy resins such as bisphenol A epoxy resins, bisphenol F epoxy resins, bisphenol S epoxy resins, bisphenol AD epoxy resins, and the like; novolac epoxy resins such as ortho-cresol novolac epoxy resins, phenol novolac epoxy resins, naphthol novolac epoxy resins, bisphenol A novolac epoxy resins, brominated phenol novolac epoxy resins, alkylphenol novolac epoxy resins, bisphenol S novolac epoxy resins, alkoxy group-containing novolac epoxy resins, and the like; and other epoxy resins such as phenol aralkyl epoxy resins (epoxy compounds derived from commonly named "Xylok resin"), resorcin diglycidyl ether, hydroquinone diglycidyl ether, catechol diglycidyl ether, biphenyl epoxy resins, tetramethylbiphenyl epoxy resins, sulfur-containing epoxy resins, bifunctional epoxy resins such as stilbene epoxy resins, triglycidyl isocyanurate, triphenylmethane epoxy resins, tetraphenylethane epoxy resins, dicyclopentadiene-phenol addition reaction-type epoxy resins, biphenyl-modified novolac epoxy resins (epoxy compounds of polyhydric phenol resins each containing phenol nuclei connected through a bismethylene group), alkoxy group-containing novolac epoxy resins, alkoxy group-containing phenyl aralkyl resins, tetrabromobisphenol A epoxy resins, brominated phenol novolac epoxy resins, and the like. These epoxy resins may be used alone or as a mixture of two or more.

Among these epoxy resins, the bisphenol epoxy resins are particularly preferred from the viewpoint that the epoxy resins have low viscosity and excellent impregnation into reinforcing fibers, and cured products have good mechanical strength and good physical property balance.

As the bisphenol epoxy resins, those having an epoxy equivalent of 500 g/eq. or less are preferred particularly from the viewpoint of excellent fluidity at normal temperature and good impregnation into reinforcing fibers, and particularly the bisphenol A epoxy resins or bisphenol F epoxy resins are preferred from the viewpoint that cured products have a good balance between rigidity and moisture and heat resistance. The epoxy equivalent of the bisphenol epoxy resins is particularly preferably in the range of 100 to 300 g/eq. in view of fluidity of the composition.

As the epoxy resin (A) used in the present invention, as described above, a bisphenol epoxy resin can be preferably used. In the present invention, the bisphenol epoxy resin may be combined with another epoxy resin according to purpose. However, in this case, the ratio of the other epoxy resin is preferably 5 to 80 parts by mass relative to 100 parts by mass of the bisphenol epoxy resin from the viewpoint that the performance of the bisphenol epoxy resin can be sufficiently exhibited.

Next, the acid group-containing radical polymerizable monomer (B) used in the present invention reacts with the epoxy resin (A) and, at the same time, induces polymerization of acryloyl groups by radical polymerization. In the present invention, the mechanical strength of a cured product can be significantly improved by curing through the in-situ polymerization reaction.

Specific examples of the acid group-containing radical polymerizable monomer (B) include acrylic acid, methacrylic acid, maleic acid, fumaric acid, crotonic acid, itaconic acid, and acid anhydrides thereof;

reaction products between hydroxyl group-containing (meth)acrylates such as hydroxyethyl methacrylate, hydroxybutyl methacrylate, and hydroxypropyl methacrylate, and polyhydric carboxylic anhydrides such as succinic anhydride, maleic anhydride, and the like; and compounds represented by structural formula (1) below

[Chem. 1]

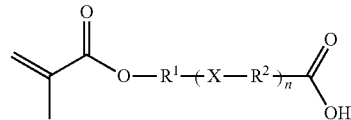

(1)

(in the formula, $R^1$ represents an aliphatic hydrocarbon group having 2 to 10 carbon atoms, X represents an ester bond or a carbonate bond, $R^2$ represents an aliphatic hydrocarbon group or aromatic hydrocarbon group having 2 to 10 carbon atoms, and n represents an integer of 1 to 5).

Examples of a compound having an ester bond as X in the structural formula 1 include compounds produced by reaction between hydroxyalkyl(meth)acrylates and aliphatic polyhydric carboxylic acids having 2 to 10 carbon atoms; compounds produced by reaction between hydroxyalkyl(meth)acrylates and aromatic dicarboxylic acids or anhydrides thereof; compounds produced by reaction between hydroxyalkyl(meth)acrylates, aliphatic diols having 2 to 10 carbon atoms, and aliphatic polyhydric carboxylic acids having 2 to 10 carbon atoms; and compounds produced by reaction between hydroxyalkyl(meth)acrylates, aliphatic diols having 2 to 10 carbon atoms, and aromatic dicarboxylic acids.

Examples of the hydroxyalkyl(meth)acrylates include β-hydroxyethyl methacrylate, β-hydroxyethyl acrylate, and the like.

Examples of the aliphatic polyhydric carboxylic acids having 2 to 10 carbon atoms include succinic anhydride, adipic acid, maleic anhydride, tetrahydrophthalic acid, and cyclohexanedicarboxylic acid. In addition, examples of the aromatic dicarboxylic acids or anhydrides thereof include phthalic acid, phthalic anhydride, isophthalic acid, terephthalic acid, tetrabromophthalic acid, tetrabromophthalic anhydride, and the like.

Further, examples of the aliphatic diols having 2 to 10 carbon atoms include 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 2-methyl-1,3-propanediol, 2,2-dimethyl-1,3-propanediol, 3-methyl-1,5-pentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,2-cyclohexanediethanol 1,3-cyclohexanediethanol, 1,4-cyclohexanediethanol, and the like. Among these diols, butanediol, pentanediol, hexanediol, cyclohexanediol, and cyclohexanedimethanol, which have 4 to 8 carbon atoms, are preferred from the viewpoint of excellent compatibility with the epoxy resin (A).

In addition, examples of a compound having a carbonate bond as X in the structural formula 1 include compounds produced by reaction between (meth)acrylic acid or a derivative thereof and polycarbonate diols produced by transesterification reaction between dialkyl carbonate and aliphatic diols having 2 to 10 carbon atoms.

Examples of the aliphatic diols having 2 to 10 carbon atoms include those having 3 to 10 carbon atoms, such as 1,2-propanediol, 1,3-propanediol, 1,4-butanediol, 1,5-pentanediol, 1,6-hexanediol, 1,7-heptanediol, 1,8-octanediol, 1,9-nonanediol, 1,10-decanediol, 2-methyl-1,3-propanediol, 2,2-dimethyl-1,3-propanediol, 3-methyl-1,5-pentanediol, 1,2-cyclohexanediol, 1,3-cyclohexanediol, 1,4-cyclohexanediol, 1,2-cyclohexanedimethanol, 1,3-cyclohexanedimethanol, 1,4-cyclohexanedimethanol, 1,2-cyclohexanediethanol, 1,3-cyclohexanediethanol, 1,4-cyclohexanediethanol, and the like. Among these, butanediol, pentanediol, hexanediol, cyclohexanediol, and cyclohexanedimethanol, which have 4 to 8 carbon atoms, are preferred from the viewpoint of excellent compatibility with the epoxy resin (A).

On the other hand, dimethyl carbonate can be used as the dialkyl carbonate in view of reactivity.

Among these compounds, those having a molecular weight of 160 or less are particularly preferred from the viewpoint that the viscosity of the composition can be decreased, impregnation into reinforcing fibers is excellent, and mechanical strength of a cured product is improved. Specifically, it is preferred to select from the group consisting of acrylic acid, methacrylic acid, maleic acid, fumaric acid, crotonic acid, and itaconic acid, and anhydrides thereof. In particular, acrylic acid and methacrylic acid, particularly, methacrylic acid, is preferred from the viewpoint of the viscosity decreasing effect and excellent mechanical strength of a cured product.

The radical polymerization initiator (C) used in the present invention may be any polymerization initiator as long as it is used as a thermal radical polymerization initiator. Examples thereof include methyl ethyl ketone peroxide, methylcyclohexanone peroxide, methylacetoacetate peroxide, acetylacetone peroxide, 1,1-bis(tert-butylperoxy)-3,3,5-trimethylcyclohexane, 1,1-bis(tert-hexylperoxy)cyclohexane, 1,1-bis(tert-hexylperoxy)-3,3,5-trimethylcyclohexane, 1,1-bis(tert-butylperoxy)cyclohexane, 2,2-bis(4,4-di-tert-butylperoxycyclohexyl)propane, 1,1-bis(tert-butylperoxy)cyclododecane, n-butyl 4,4-bis(tert-butylperoxy)valerate, 2,2-bis(tert-butylperoxy)butane, 1,1-bis(tert-butylperoxy)-2-methylcyclohexane, tert-butyl hydroperoxide, P-menthane hydroperoxide, 1,1,3,3-tetramethylbutyl hydroperoxide, tert-hexyl hydroperoxide, dicumyl peroxide, 2,5-dimethyl-2,5-bis(tert-butylperoxy)hexane, α,α'-bis(tert-butylperoxy)diisopropylbenzene, tert-butylcumyl peroxide, di-tert-butyl peroxide, 2,5-dimethyl-2,5-bis(tert-butylperoxy)hexyne-3, isobutyryl peroxide, 3,5,5-trimethylhexanoyl peroxide, octanoyl peroxide, lauroyl peroxide, cinnamoyl peroxide, m-toluoyl peroxide, benzoyl peroxide, diisopropyl peroxydicarbonate, bis(4-tert-butylcyclohexyl)peroxydicarbonate, di-3-methoxybutyl peroxydicarbonate, di-2-ethylhexyl peroxydicarbonate, di-sec-butyl peroxydicarbonate, di(3-methyl-3-methoxybutyl)peroxydicarbonate, di(4-tert-butylcyclohexyl)peroxydicarbonate, α,α'-bis(neodecanoylperoxy)diisopropylbenzene, cumyl peroxyneodecanoate, 1,1,3,3,-tetramethylbutyl peroxyneodecanoate, 1-cyclohexyl-1-methylethyl peroxyneodecanoate, tert-hexyl peroxyneodecanoate, tert-butyl peroxyneodecanoate, tert-hexyl peroxypivalate, tert-butyl peroxypivalate, 2,5-dimethyl-2,5-bis(2-ethylhexanoylperoxy)hexane, 1,1,3,3-tetramethylbutylperoxy-2-ethyl hexanoate, 1-cyclohexyl-1-methylethylperoxy-2-ethyl hexanoate, tert-hexylperoxy-2-ethyl hexanoate, tert-butylperoxy-2-ethyl hexanoate, tert-butyl peroxyisobutylate, tert-butyl peroxymaleic acid, tert-butyl peroxylaurate, tert-butylperoxy-3,5,5-trimethyl hexanoate, tert-butylperoxyisopropyl monocarbonate, t-butylperoxy-2-ethylhexyl monocarbonate, 2,5-dimethyl-2,5-bis(benzoylperoxy)hexane, tert-butyl peroxyacetate, tert-hexyl peroxybenzoate, tert-butyl peroxy-m-toluoryl benzoate, tert-butyl peroxybenzoate, bis(tert-butylperoxy)isophthalate, tert-butylperoxyally monocarbonate, 3,3',4,4'-tetra(tert-butylperoxycarbonyl)benzophenone, and the like. The radical polymerization initiator (C) is preferably contained at a ratio of 0.001% by mass or more and 5% by mass or less relative to the total mass of the radical polymerizable components and the radical polymerization initiator (C).

The amine-based curing agent (D) for an epoxy resin used in the present invention is a curing agent for epoxy resin composed of a primary or secondary amine. In the present invention, the epoxy resin (A) is reacted with acid groups in the acid group-containing radical polymerizable monomer (B) and a polymer thereof, and is moreover cured in combination with the amine-based curing agent (D) for epoxy resin, thereby significantly increasing the strength of a cured product. Specific examples of the amine-based curing agent (D) for an epoxy resin include aliphatic amines such as diethylene triamine, triethylene tetramine, isophorone diamine, and the like; and aromatic amines such as diethyltoluenediamine meta-phenylenediamine, para-phenylenediamine, 3,3'-diaminodiphenylsulfone, 4,4'-diaminodiphenylsulfone, 4,4'-diaminodiphenylmethane, 4,4'-diaminodiphenyl ether, and the like. Among these, the aromatic amines are particularly preferred from the viewpoint of good curability.

With respect to the mixing ratio between the epoxy resin (A), the acid group-containing radical polymerizable monomer (B), and the amine-based curing agent (D) for an epoxy resin, which are described in detail above, from the viewpoint of excellent mechanical strength of a cured product, it is preferred that the equivalent ratio (epoxy group/acid group) between epoxy groups in the epoxy resin (A) and acid group in the acid group-containing polymerizable monomer (B) is 1/0.8 to 1/0.05, and the equivalent ratio (acid group/active hydrogen) between an acid group in the acid group-containing polymerizable monomer (B) and active hydrogen in the amine-based curing agent (D) for epoxy resin is 5/95 to 80/20. In particular, from the viewpoint that an attempt can be made to decrease the viscosity of the composition while maintaining excellent mechanical strength of a cured product, it is preferred that the equivalent ratio (epoxy group/acid group) between epoxy groups in the epoxy resin (A) and acid group in the acid group-containing polymerizable monomer (B) is 1/0.8 to 1/0.05, and the equivalent ratio (acid group/active hydrogen) between an acid group in the acid group-containing polymerizable monomer (B) and active hydrogen in the amine-based curing agent (D) for epoxy resin is 50/50 to 80/20.

In addition, from the viewpoint of curability, the amount of the radical polymerization initiator (C) mixed is a ratio of 0.1 to 3 parts by mass relative to 100 parts by mass of the composition.

The resin composition for a fiber-reinforced composite material of the present invention may further appropriately contain a reaction catalyst for reacting the epoxy resin (A) and the acid group-containing radical polymerizable monomer (B). Examples of the reaction catalyst include tertiary amines such as triethylamine, N,N-benzyldimethylamine, N,N-dimethylphenylamine, N,N-dimethylaniline, and diazabicyclooctane; quaternary ammonium salts such as trimethylbenzyl ammonium chloride, triethylbenzyl ammonium chloride, methyltriethyl ammonium chloride, and the like; phosphines such as triphenylphosphine, tributylphosphine, and the like; imidazoles such as 2-methylimidazole, 1,2-dimethylimidazole, 2-ethyl-4-methylimidazole, and the like; triphenylstibine; anion exchange resins; $BF_3$-amine complexes; guanidine derivatives; polyamide resins synthesized from a linolenic acid dimer and ethylenediamine; and the like. The amount of the catalyst used in the resin composition for a fiber-reinforced composite material, which is vanish, is preferably in the range of 0.01% to 5% by mass, particularly 0.05% to 5% by mass, in view of excellent reactivity.

The resin composition for a fiber-reinforced composite material of the present invention preferably contains another radical polymerizable monomer in combination with the component (B) from the viewpoint that functionality such as moderate flexibility and strength can be imparted to a cured product, and the viscosity of the vanish can be further decreased according to application. Examples of the radical polymerizable monomer which can be used include styrene, methylstyrene, halogenated styrene, divinylbenzene, and (meth)acrylates represented by the following.

Examples of monofunctional (meth)acrylates which can be used in the present invention include (meth)acrylates having substituents such as methyl, ethyl, propyl, butyl, 3-methoxybutyl, amyl, isoamyl, 2-ethylhexyl, octyl, isooctyl, nonyl, isononyl, decyl, isodecyl, dodecyl, tridecyl, hexadecyl, octadecyl, stearyl, isostearyl, cyclohexyl, benzyl, methoxyethyl, butoxyethyl, phenoxyethyl, nonylphenoxyethyl, glycidyl, dimethylaminoethyl, diethylaminoethyl, isobornyl, dicyclopentanyl, dicyclopentenyl, dicyclopentenyloxyethyl, and the like.

Examples of polyfunctional (meth)acrylates include di(meth)acrylates of 1,3-butylene glycol, 1,4-butanediol, 1,5-pentanediol, 3-methyl-1,5-pentanediol, 1,6-hexanediol, neopentyl glycol, 1,8-octanediol, 1,9-nonanediol, tricyclodecane dimethanol, ethylene glycol, polyethylene glycol, propylene glycol, dipropylene glycol, tripropylene glycol, polypropylene glycol, and the like; di(meth)acrylate of tris(2-hydroxyethyl)isocyanurate; a diol di(meth)acrylate produced by adding 2 moles or more of ethylene oxide or propylene oxide to 1 mole of 1,6-hexanediol; a diol di(meth)acrylate produced by adding 4 moles or more of ethylene oxide or propylene oxide to 1 mole of neopentyl glycol; a diol di(meth)acrylate produced by adding 2 moles of ethylene oxide or propylene oxide to 1 mole of bisphenol A; a triol di- or tri-(meth)acrylate produced by adding 3 moles or more of ethylene oxide or propylene oxide to 1 mole of trimethylolpropane; a diol di(meth)acrylate produced by adding 4 moles or more of ethylene oxide or propylene oxide to 1 mole of bisphenol A; trimethylolpropane tri(meth)acrylate; pentaerythritol tri (meth)acrylate; pentaerythritol tetra(meth)acrylate; dipentaerythritol poly(meth)acrylate; ethylene oxide-modified phosphoric acid(meth)acrylate; ethylene oxide-modified alkylated phosphoric acid(meth)acrylate; and the like.

Besides these (meth)acrylates, a functional oligomer containing an ethylenically double bond, such as urethane(meth) acryl oligomer, epoxy(meth)acryl oligomer, or the like can be further added. These can be used alone or in combination of two or more at a desired ratio.

The amount of the radical polymerizable monomer (E) used is preferably a ratio of 5 to 40 parts by mass relative to 100 parts by mass of the total mass of the epoxy resin (A), the acid group-containing radical polymerizable monomer (B), the radical polymerization initiator (C), and the amine-based curing agent (D) for an epoxy resin. Within the range of 5 parts by mass or more, impregnation into a fibrous base material is improved, while within the range of 40 parts by mass or less, a molded product as a cured product is excellent in dimensional stability and mechanical strength.

The above-detailed resin composition for a fiber-reinforced composite material of the present invention may further contain a flame retardant from the viewpoint of imparting flame retardancy to a cured product. Examples of the flame retardant used include halogen-based flame retardants such as poly(brominated diphenyl ether), poly(brominated biphenyl), tetrabromobisphenol A, tetrabromobisphenol A epoxy resins, and the like; and non-halogen-based flame retardants such as phosphorus-based flame retardants, nitrogen-based flame retardants, silicone-based flame retardants, inorganic flame retardants, organic metal salt-based flame retardants, and the like. Among these, the non-halogen flame retardants are particularly preferred because of the recent high requirement for the non-halogen type.

If required, various compounding agents such as a silane coupling agent, a release agent, an ion trapping agent, a pigment, etc. can be added to the resin composition for a fiber-reinforced composite material of the present invention.

The resin composition for a fiber-reinforced composite material of the present invention can be easily prepared as a liquid composition by uniformly stirring the above-described components.

The resin composition for a fiber-reinforced composite material of the present invention is a liquid composition at normal temperature as described above and can be prepared as vanish with using no organic solvent or using a very small amount of organic solvent. Examples of the organic solvent include acetone, methyl ethyl ketone, toluene, xylene, methyl isobutyl ketone, ethyl acetate, ethylene glycol monomethyl ether, N,N-dimethylformamide, methanol, ethanol, and the like. The amount of the organic solvent used is preferably 10% by mass or less in the composition, and particularly substantially no organic solvent is preferably used.

The resin composition for a fiber-reinforced composite material of the present invention can be produced by uniformly mixing the above-described components. The thus-produced resin composition for a fiber-reinforced composite material, i.e., vanish for impregnation of reinforcing fibers, has a viscosity of 500 mPa·s or less at 50° C. measured by an E-type viscometer and exhibits excellent fluidity. Specifically, the vanish prepared by uniformly mixing the components preferably has a viscosity of 5 to 500 mPa·s, particularly 5 to 400 mPa·s, measured at 50° C. with an E-type viscometer ("TV-20 model" cone-plate type, manufactured by Toki Sangyo Co., Ltd.). Since the vanish of the present invention has such very lower viscosity than usual vanish for CFRP, impregnation of a fiber reinforcement with the vanish can be performed at a relatively low temperature. On the other hand, it is a significant point that in spite of using the vanish having such low viscosity, a molding produced by impregnating the fiber reinforcement with the vanish and curing by the in-situ polymerization reaction exhibits excellent mechanical strength and is not inferior to conventional CFRP moldings in strength.

As described above, the cured product of the resin composition for a fiber-reinforced composite material of the present invention is produced by the in-situ polymerization reaction after a reinforcing base material composed of reinforcing fibers is impregnated with the vanish prepared by uniformly mixing the components. The term "in-situ reaction" represents that both the reaction between an epoxy group and an acid group and the polymerization reaction of the radical polymerizable group are simultaneously or continuously performed without being distinguished as separate reaction steps.

Specifically, the curing temperature for the in-situ polymerization reaction is preferably in the temperature range of 50 to 250° C., and particularly preferably, curing is performed at 50 to 100° C. to form a tack-free cured product, followed by further treatment under a temperature condition of 120° C. to 200° C.

In addition, a fiber-reinforced composite material of the present invention contains the above-described resin composition for a fiber-reinforced composite material and reinforcing fibers as essential components, and specifically the fiber-reinforced composite material is produced by impregnating a reinforcing base material composed of reinforcing fibers with the vanish, i.e., the resin composition for a fiber-reinforced composite material, prepared by uniformly mixing the components.

Therefore, the cured product is produced by impregnating a reinforcing base material composed of reinforcing fibers with the resin composition for a fiber-reinforced composite material and then performing the in-situ polymerization reaction.

Herein, the reinforcing fibers may be any one of a twist yarn, an untwisted yarn, and a zero-twist yarn. Among these the untwisted yarn and the zero-twist yarn are preferred because both moldability and mechanical strength of a fiber-reinforced plastic member are satisfied. Further, as a form of the reinforcing fibers, fibers aligned in one direction or a fabric can be used. The fabric can be freely selected from a plain fabric, a satin fabric, and the like according to the place and purpose of use. Specifically, carbon fibers, glass fibers, aramid fibers, boron fibers, alumina fibers, silicon carbide fibers, and the like can be used because of excellent mechanical strength and durability. These may be used in combination of two or more types. Among these, the carbon fibers or the glass fibers are particularly preferred from the viewpoint of good strength of a molding. As the carbon fibers, various types such as polyacrylonitrile-based, pitch-based, and rayon-based fibers can be used. In particular, the polyacrylonitrile-based carbon fibers are preferred because high-strength carbon fibers can be easily produced. On the other hand, a glass soft mat, a glass cloth, a strong cloth, and the like can be used as the glass fibers.

A fiber-reinforced resin molding of the present invention is a molding including reinforcing fibers and a cured product of the resin composition for a fiber-reinforced composite material, and specifically the amount of the reinforcing fibers in the fiber-reinforced resin molding is preferably in the range of 40 to 70% by mass, and particularly from the viewpoint of strength, in the range of 50 to 70% by mass.

Examples of a process for producing the fiber-reinforced resin molding include a hand lay-up process or spray-up process including spreading a fiber aggregate in a mold and then laminating the vanish in multiple layers; a vacuum bag process in which a base material composed of reinforcing fibers is stacked while being impregnated with the vanish using one of male and female molds to form a molded product, and the molded product is covered with a flexible mold capable of applying pressure to the molded product, airtight-sealed, and then vacuum (reduced-pressure)-molded; a SMC press process in which the vanish containing reinforcing fibers is formed into a sheet and then compression-molded with a mold; a RTM process including injecting the vanish into a combined mold having a fiber bed; and a process including producing a prepreg by impregnating reinforcing fibers with the vanish and then baking the prepreg in a large autoclave. Among these processes, the RTM process is preferred in view of excellent fluidity of the vanish.

A specific preferred process for producing the fiber-reinforced resin molding by the RTM process is a production process of the present invention described in detail below.

That is, the process for producing the fiber-reinforced resin molding of the present invention includes impregnating, by injection, a base material composed of reinforcing fibers disposed in a mold with the vanish followed by in-situ curing.

Examples of the base material composed of reinforcing fibers include a fabric, a knit, a mat, and a blade, which are composed of reinforcing fibers. Any one of these materials may be further laminated, shaped, and fixed by means such as a binder or stitching and used as a preform.

In addition, a closed mold made of a material such as iron, steel, aluminum, FRP, wood, gypsum, or the like can be used as the mold.

In further detail, the production process of the present invention includes shaping the base material composed of reinforcing fibers along the mold surface of a lower mold, clamping the base material with the upper and lower molds, injecting the vanish into the mold, and then in-situ curing the vanish under the above-described curing temperature condition. In this case, before the base material composed of reinforcing fibers is disposed on the mold surface of the lower mold, a gel coating is preferably applied to the mold surface from the viewpoint of good appearance of the molding. After curing, the intended fiber-reinforced resin molding can be obtained by removal from the mold. In the present invention, after the removal from the mold, post-curing may be further performed at a higher temperature.

In addition, besides the reinforcing fiber base material, a foam core, a honeycomb core, or a metal component may be disposed in the mold to produce a composite material integrated with this member. In particular, a sandwich structure produced by disposing carbon fiber base materials on both sides of the foam core and then molding is useful as, for example, an outside plate material for an automobile or an aircraft, because it is lightweight and has large flexural rigidity.

On the other hand, a specific example of the process for producing the fiber-reinforced resin molding by the vacuum impregnation process (VaRTM process) is a process in which the reinforcing fiber base material is laminated on either the male mold or the female mold and is further covered with a plastic film, and the vanish is injected under vacuum pressure attained by vacuum suction to impregnate the reinforcing fiber base material with the vanish, and is then cured by the in-situ polymerization reaction.

The vacuum impregnation process (VaRTM process) is a RTM process, and a usable mold material is substantially the same as in the RTM process. In addition, the reinforcing fiber base material is preferably composed of carbon fibers or glass fibers from the viewpoint of strength of the resultant molding. In particular, a large blade such as a wind-power generation blade is preferably produced by the vacuum impregnation process (VaRTM process) from the viewpoint that the blade is required to have high strength and rigidity and is produced with a large area and a large thickness. In addition, reinforcing fibers for such a wind-power generation blade are preferably glass fibers in view of easy response to an increase in size of the molding. The wind-power generation blade tends to be significantly increased in size, and low viscosity and long pot life of vanish are important factors for producing glass fiber-reinforced plastic (GFRP) having a low void content and high quality. The fiber-reinforced resin composition of the present invention complies with these requirements and thus is particularly suitable as a resin material for a wind-power generation blade.

Examples of application of the fiber-reinforced resin molding produced as described above include sporting goods such as a fish pole, a golf shaft, a bicycle frame, and the like; frames or body materials of automobiles and aircrafts; spacecraft members; a wind-power generation blade; and the like. In particular, an automobile member, an aircraft member, and a spacecraft member are required to have a high degree of mechanical strength, and thus the fiber-reinforced resin molding of the present invention is suitable for these applications. On the other hand, the resin composition for a fiber-reinforced composite material is particularly suitable for large moldings such as a wind-power generation blade because the vanish has very excellent fluidity.

EXAMPLES

Although the present invention is specifically described below with reference to examples and comparative examples, "parts" and "%" below are on a weight basis unless otherwise specified. Each of the physical properties was measured under conditions described below.

1) Vanish viscosity: measured at 50° C. using an E-type viscometer ("TV-20 type" cone-plate type, manufactured by Toki Sangyo Co., Ltd.).

2) Glass transition point (differential scanning calorimetry (DSC process)): measured using "DSC1" manufactured by Mettler Toledo Inc. under the conditions of a measurement temperature range of 25 to 250° C. and a heating rate of 10° C./min.

3) Flexural strength and flexural elastic modulus of resin plate: according to JIS 6911

Examples 1 to 10

1. Mixing of Epoxy Resin Composition

According to each of the compositions shown in Tables 1 and 2 below, an epoxy resin, a carboxylic acid, a polymerizable compound, a radical polymerization initiator, a curing promoter, etc. were mixed with a stirrer to prepare an epoxy resin composition. Vanish viscosity was evaluated using the epoxy resin composition.

2. Formation of Epoxy Resin Cured Plate

The epoxy resin composition was poured into a space of a mold including a spacer (silicone tube) having a thickness of 2 mm and held between glass plates and then cured at 100° C. for 1 hour in an oven, and a cured product was removed from the mold and confirmed to be tack-free. Then, the product was further after-cured at 170° C. for 1 hour to produce a resin cured plate having a thickness of 2 mm. Evaluation tests were carried out using the resin cured plate as a test piece. The results are shown in Table 1.

3. Preparation and Evaluation of Carbon Fiber-Reinforced Composite Material

Four carbon fiber fabrics (carbon fiber: C06343, fabric weight 198 g/cm$^2$, manufactured by Toray Co., Ltd.) cut into 150 mm×150 mm were stacked on a SUS sheet of 200 mm×200 mm×3.5 mm coated with polytetrafluoroethylene/perfluoroalkylvinyl ether copolymer, and the epoxy resin composition previously heated to 50° C. was cast and pressed with a roller to impregnate the carbon fibers with the resin composition. Further, another SUS sheet coated with polytetrafluoroethylene/perfluoroalkylvinyl ether copolymer was placed. Then, curing was performed at 100° C. for 1 hour in an oven, and then after curing was performed at 170° C. for 1 hour to produce a fiber-reinforced composite material having a thickness of 1.5 mm. A test piece entirely impregnated with the resin and having a good appearance was evaluated as "Good", and a test piece impregnated with the resin insufficiently was evaluated as "Poor". The results are shown in Table 1.

Comparative Examples 1 to 3

1. Mixing of Epoxy Resin Composition

According to each of the compositions shown in Table 2 below, components were mixed with a stirrer to prepare an epoxy resin composition. Vanish viscosity was evaluated using the epoxy resin composition.

2. Formation of Resin Cured Plate of Epoxy Resin Composition

The epoxy resin composition was poured into a space of the same mold as used in Examples and then cured at 100° C. for 4 hours in an oven to produce a resin cured plate having a thickness of 2 mm. Evaluation tests were carried out using the resin cured plate as a test piece. The results are shown in Table 2.

3. Preparation of Carbon Fiber-Reinforced Composite Material

A carbon fiber-reinforced composite material was produced and evaluated by the same operations as in Examples 1 to 10.

TABLE 1

|  |  | Example | | | |
|---|---|---|---|---|---|
|  |  | 1 | 2 | 3 | 4 |
| Composition | Epoxy A | 59.8 | 68.2 | 61.5 | 71.8 |
|  | Epoxy B |  |  |  |  |
|  | Methacylic acid | 13.7 | 6.2 | 14.1 | 6.6 |
|  | Styrene | 16.6 | 7.6 | 17.1 | 8 |
|  | Amine A | 9.8 | 18 |  |  |
|  | Amine B |  |  | 7.3 | 13.6 |
|  | Peroxide | 1 | 1 | 1 | 1 |
|  | 2E4MZ | 1 | 1 | 1 | 1 |
| Epoxy group/methacrylic acid equivalent ratio |  | 1/0.5 | 1/0.2 | 1/0.5 | 1/0.2 |
| Methacrylic acid/ amine equivalent ratio |  | 50/50 | 20/80 | 50/50 | 20/80 |
| Evaluation of physical properties | Viscosity (mPaS: 50° C.) | 35 | 300 | 22 | 230 |
|  | Flexural strength (MPa) | 110 | 115 | 115 | 113 |
|  | Elastic modulus (MPa) | 3300 | 3260 | 2900 | 2858 |
|  | DSC Tg | 144 | 143 | 144 | 142 |
|  | CFRP appearance evaluation = evaluation of moldability | Good | Good | Good | Good |

The invention claimed is:

1. A resin composition for a fiber-reinforced composite material, the resin composition comprising, as essential components, a bisphenol epoxy resin (A), an acid group-containing radical polymerizable monomer (B) selected from the group consisting of acrylic acid, methacrylic acid, maleic acid, fumaric acid, crotonic acid, itaconic acid, and acid anhydrides thereof, a radical polymerization initiator (C), and an amine-based curing agent (D) for an epoxy resin, wherein the mixing ratio of the components is such that the equivalent ratio (epoxy group/acid group) between an epoxy group in the bisphenol epoxy resin (A) and an acid group in the acid group-containing polymerizable monomer (B) is 1/0.8 to 1/0.05, and the equivalent ratio (acid group/active hydrogen) between an acid group in the acid group-containing polymerizable monomer (B) and active hydrogen in the amine-based curing agent (D) for an epoxy resin is 50/50 to 80/20, and the viscosity at 50° C. measured with an E-type viscometer is 500 mPa·s or less.

2. The resin composition for a fiber-reinforced composite material according to claim 1, wherein the amount of the radical polymerization initiator (C) mixed is a ratio of 0.1 to 3 parts by mass relative to 100 parts by mass of the composition.

3. The resin composition for a fiber-reinforced composite material according to claim 1, wherein the bisphenol epoxy resin has an epoxy equivalent of 500 g/eq. or less.

4. The resin composition for a fiber-reinforced composite material according to claim 1, further comprising a radical polymerizable monomer (E) other than the component (B) in addition to the components (A) to (D).

5. The resin composition for a fiber-reinforced composite material according to claim 2, wherein the amount of the radical polymerizable monomer (E) mixed is a ratio of 5 to 40 parts by mass relative to 100 parts by mass of the total mass of the components (A) to (E).

TABLE 2

|  |  | Example | | | | | | Comparative Example | | |
|---|---|---|---|---|---|---|---|---|---|---|
|  |  | 5 | 6 | 7 | 8 | 9 | 10 | 1 | 2 | 3 |
| Composition | Epoxy A |  |  |  |  |  |  |  |  |  |
|  | Epoxy B | 69.6 | 74.3 | 73.1 | 70.2 | 68.2 | 67.1 | 89.9 | 77.5 | 77.5 |
|  | Methacylic acid | 3.6 | 3.7 | 7.2 | 14.2 | 20.5 | 23.5 | 4.7 |  |  |
|  | Styrene | 4.2 | 4.5 | 4.6 | 4.4 | 4.3 | 4.2 | 5.3 |  |  |
|  | Amine A | 22.6 |  |  |  |  |  |  |  |  |
|  | Amine B |  | 17.4 | 15.1 | 11 | 7 | 5.1 |  | 21.3 | 21.8 |
|  | Peroxide | 1 | 1 | 1 | 1 | 1 | 1 | 1 |  |  |
|  | 2E4MZ | 1 | 1 | 1 | 1 | 1 | 1 | 1 |  |  |
|  | Lewis acid catalyst A |  |  |  |  |  |  |  | 0.7 |  |
|  | Lewis acid catalyst B |  |  |  |  |  |  |  |  | 0.7 |
| Epoxy group/methacrylic acid equivalent ratio |  | 1/0.1 | 1/0.1 | 1/0.2 | 1/0.4 | 1/0.6 | 1/0.7 | 1/1 |  |  |
| Methacrylic acid/amine equivalent ratio |  | 10/90 | 10/90 | 20/80 | 40/60 | 60/40 | 70/30 | 100/0 |  |  |
| Evaluation of physical properties | Viscosity (mPaS: 50° C.) | 270 | 200 | 130 | 65 | 74 | 50 | 38 | 3300 | 2800 |
|  | Flexural strength (MPa) | 157 | 137 | 136 | 125 | 123 | 132 | 110 | 135 | 118 |
|  | Elastic modulus (MPa) | 3630 | 3151 | 3150 | 3340 | 3407 | 3582 | 3389 | 3371 | 3263 |
|  | DSC Tg (° C.) | 122 | 116 | 127 | 149 | 145 | 145 | 120 | 107 | 105 |
|  | CFRP appearance evaluation = evaluation of moldability | Good | Good | Good | Good | Good | Good | Good | Poor | Poor |

"Epoxy A": bisphenol A liquid epoxy resin, trade name "EPICLON 850S" manufactured by DIC Corporation, epoxy equivalent of 188 g/eq.
"Epoxy B": bisphenol F liquid epoxy resin, trade name "EPICLON 830" manufactured by DIC Corporation, epoxy equivalent of 171 g/eq.
"Amine A": diaminodiphenylsulfone
"Amine B": diethyltoluenediamine ("ETHACURE 100" manufactured by PTI Japan Ltd.)
"Peroxide": 1,1-di(tert-hexylperoxy)cyclohexane, trade name "PERHEXA HC", polymerization initiator manufactured by NOF Corporation
"2E4MZ": 2-ethyl-4-methylimidazole
"Lewis acid catalyst A": boron trifluoride tetrahydrofuran complex
"Lewis acid catalyst B": boron trifluoride diethyl ether complex 6. A cured product produced by in-situ polymerization reaction of the resin composition for a fiber-reinforced composite material according to claim 1.

7. A fiber-reinforced composite material comprising, as essential components, reinforcing fibers and the resin composition for a fiber-reinforced composite material according to claim 1.

8. A fiber-reinforced resin molding comprising, as essential components, reinforcing fibers and a cured product of the resin composition for a fiber-reinforced composite material according to claim 1.

9. A process for producing a fiber-reinforced resin molding, the process comprising impregnating, by injection, a base material, which is composed of reinforcing fibers and disposed in a mold, with the resin composition for a fiber-reinforced composite material according to claim 1, and then curing the resin composition by in-situ polymerization reaction.

10. The process for producing a fiber-reinforced resin molding being a cured product produced by in-situ polymerization reaction of the resin composition for a fiber-reinforced composite material, wherein the process uses a vacuum RTM molding process including reducing the pressure in a cavity of a mold in which a base material composed of reinforcing fibers is disposed, and impregnating the base material with the resin composition for a fiber-reinforced composite material according to claim 1 by injecting the resin composition into the cavity using a differential pressure between the reduced pressure in the cavity and outside pressure.

11. A cured product produced by in-situ polymerization reaction of the resin composition for a fiber-reinforced composite material according to claim 2.

12. A fiber-reinforced composite material comprising, as essential components, reinforcing fibers and the resin composition for a fiber-reinforced composite material according to claim 2.

13. A fiber-reinforced resin molding comprising, as essential components, reinforcing fibers and a cured product of the resin composition for a fiber-reinforced composite material according to claim 2.

14. A process for producing a fiber-reinforced resin molding, the process comprising impregnating, by injection, a base material, which is composed of reinforcing fibers and disposed in a mold, with the resin composition for a fiber-reinforced composite material according to claim 2, and then curing the resin composition by in-situ polymerization reaction.

15. The process for producing a fiber-reinforced resin molding being a cured product produced by in-situ polymerization reaction of the resin composition for a fiber-reinforced composite material, wherein the process uses a vacuum RTM (resin transfer molding) process including reducing the pressure in a cavity of a mold in which a base material composed of reinforcing fibers is disposed, and impregnating the base material with the resin composition for a fiber-reinforced composite material according to claim 2 by injecting the resin composition into the cavity using a differential pressure between the reduced pressure in the cavity and outside pressure.

* * * * *